US007162354B2

(12) United States Patent
Takada et al.

(10) Patent No.: US 7,162,354 B2
(45) Date of Patent: Jan. 9, 2007

(54) APPARATUS AND METHOD FOR DETERMINING DATE OF GAS TURBINE WASHING

(75) Inventors: Masatoshi Takada, Chiyoda-ku (JP); Yoshiharu Hayashi, Chiyoda-ku (JP); Yoshitaka Kojima, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 353 days.

(21) Appl. No.: 10/896,922

(22) Filed: Jul. 23, 2004

(65) Prior Publication Data

US 2005/0096832 A1 May 5, 2005

(30) Foreign Application Priority Data

Oct. 29, 2003 (JP) ............................ 2003-368243

(51) Int. Cl.
*F02C 7/00* (2006.01)
*B08B 3/02* (2006.01)
*G06F 19/00* (2006.01)

(52) U.S. Cl. ............................ 701/100; 701/1; 701/35; 210/85

(58) Field of Classification Search .................... 701/1, 701/100, 29, 35; 210/171, 85; 417/244, 417/251; 427/319; 118/58, 73; 415/116, 415/117
See application file for complete search history.

(56) References Cited

U.S. PATENT DOCUMENTS

2002/0141882 A1* 10/2002 Ingistov et al. ............. 417/244
2004/0011713 A1* 1/2004 Ushioda et al. ............... 210/85
2004/0028816 A1* 2/2004 Ackerman et al. .......... 427/319

FOREIGN PATENT DOCUMENTS

JP 8-296453 11/1996

OTHER PUBLICATIONS

Patent Abstracts of Japan for JP 8-296453.

* cited by examiner

*Primary Examiner*—Tan Nguyen
(74) *Attorney, Agent, or Firm*—Crowell & Moring LLP

(57) ABSTRACT

A gas turbine washing-date determination apparatus of the present invention is equipped with a sum cost calculation means for calculating a sum of loss cost due to not washing a compressor from a compressor efficiency calculated, and determines a gas turbine washing-date with using the sum of the loss cost. Meanwhile, in the gas turbine washing-date determination apparatus the compressor efficiency is calculated from process data of a gas turbine plant, and a compressor washing-date is determined, based on the compressor efficiency.

15 Claims, 7 Drawing Sheets

FIG.3

| Date | Compressor Inlet Temperature | Compressor Discharge Temperature | Compressor Inlet Pressure | Compressor Discharge Pressure | Inlet Guide Vane Opening |
|---|---|---|---|---|---|
| 2002/10/05 11:00:00 | 15.02728271 | 381.0015259 | 9.534 | 14.81570214 | 25.43 |
| 2002/10/06 12:00:00 | 15.33984375 | 381.1404419 | 9.305 | 14.84464716 | 41.35 |
| 2002/10/07 11:00:00 | 19.85461426 | 386.3845215 | 9.512 | 14.57978729 | 59.31 |

| Process Name | Process Name Tag No. | Unit |
|---|---|---|
| Compressor Inlet Temperature | CTIF | deg C |
| Compressor Discharge Pressure | CPD | hPa |

APPARATUS AND METHOD FOR DETERMINING DATE OF GAS TURBINE WASHING

BACKGROUND OF THE INVENTION

1. Field of the Invention

The present invention relates to a washing-date determination apparatus and determination method for determining a compressor washing-date in a gas turbine plant.

2. Description of the Related Art

A gas turbine generator compresses air taken in by a compressor, burns a fuel with a burner with using the compressed air, rotates a turbine by a generated combustion gas, and generates power. Although when taking in the air, dust in the air is removed with installing a filter at a suction portion, part of dust, which is not removable, invades a compressor, adheres to surfaces of vanes, lowers a compressor efficiency, and consequently, lowers a gas turbine power-generation efficiency.

In order to remove contaminants of compressor vanes, a washing apparatus, mainly a water-washing apparatus, for washing the compressor is usually equipped. Because although the compressor efficiency is recovered by water-washing, an implementation thereof costs high, it becomes important to implement the water-washing at appropriate timing.

As a technique for detecting an implementation date of the water-washing, there is a method described in Japanese Patent Laid-Open Publication Hei 8-296453 (see the abstract and claims thereof). This calculates a compensation compressor efficiency, where an influence of a compressor suction air temperature and an inlet guide opening are subracted by compensation, and determines it as the implementation date of the water-washing when a difference between the compensation compressor efficiency and an initial value of a compressor efficiency after last-time washing exceeds a constant value.

In the method for determining the washing date from a lowering amount of the compensation compressor efficiency, washing can be implemented at timing when a degree of contaminants of a compressor reaches constant. However, when totally considering operation cost necessary for washing, non power-generation loss due to a stoppage of a gas turbine during the washing, and furthermore, a profit of a fuel-consumption improvement thanks to a gas turbine efficiency recovered by the washing, a washing-date determination by nothing but the degree of the contaminants of the compressor does not always becomes optimal timing from a viewpoint of total cost.

In addition, because in a compressor efficiency of an actual machine a variation occurs due to various parameters such as an ambient condition, it is difficult to determine at which timing a compressor efficiency reaches a standard value in the method for implementing a determination by whether or not a difference between a compressor efficiency obtained by a observation and the standard value exceeds a constant value.

Consequently, is strongly requested a determination apparatus and determination method, which enable the washing-date for suppressing total cost from the compressor efficiency with variations.

SUMMARY OF THE INVENTION

The present invention is a gas turbine washing-date determination apparatus designed to calculate a compressor efficiency of process data of a gas turbine plant; determine a compressor washing-date, based on the compressor efficiency; comprise a calculation means for calculating a sum of loss cost due to not washing the compressor from the calculated compressor efficiency; and determine a gas turbine washing-date with using the sum of the loss cost In addition, the present invention is a gas turbine washing-date determination method that calculates a compressor efficiency of process data of a gas turbine plant; determines a compressor washing-date, based on the compressor efficiency; comprises the steps of calculating a sum of loss cost due to not washing the compressor from the calculated compressor efficiency and determining a gas turbine washing-date with using the sum of the loss cost.

The gas turbine washing-date determination apparatus of the present invention is preferable to be designed so as to comprise a process data storage device for storing process data, a compressor efficiency calculation means for calculating the compressor efficiency from the process data stored in the process data storage device, a sum cost calculation means for calculating a sum of loss cost due to not washing a compressor from the calculated compressor efficiency, and a washing-date determination means for determining a gas turbine washing-date with using the calculated sum of the loss cost.

In addition, the gas turbine washing-date determination method of the present invention is preferable to be designed so as to comprise the steps of reading process data stored in a process data storage device, calculating a compressor efficiency from the process data, calculating a sum of loss cost due to not washing a compressor from the calculated compressor efficiency, and determining a gas turbine washing-date with using the calculated sum of the loss cost.

The gas turbine washing-date determination apparatus of the present invention can further comprise a washing control apparatus for driving a control panel of a gas turbine and a compressor washing apparatus at a relevant washing-date and washing a compressor, based on a washing-date by the washing-date determination means.

In addition, the present invention provides a computer readable recording medium, where is memorized a gas turbine washing-date determination program that makes a computer run a step of reading process data of a gas turbine plant stored in a process data storage device, a processing of calculating a compressor efficiency from the process data, another processing of calculating a sum of cost loss due to not washing a compressor from the compressor efficiency calculated, and still another processing of determining a gas turbine washing-date with using the calculated sum of the loss cost.

BRIEF DESCRIPTION OF THE DRAWINGS

FIG. 3 is a drawing showing one example of a data storage format of a process data storage device.

DESCRIPTION OF THE MOST PREFERRED EMBODIMENTS

Here will be described embodiments of the present invention, referring to drawings.

Figure 1:
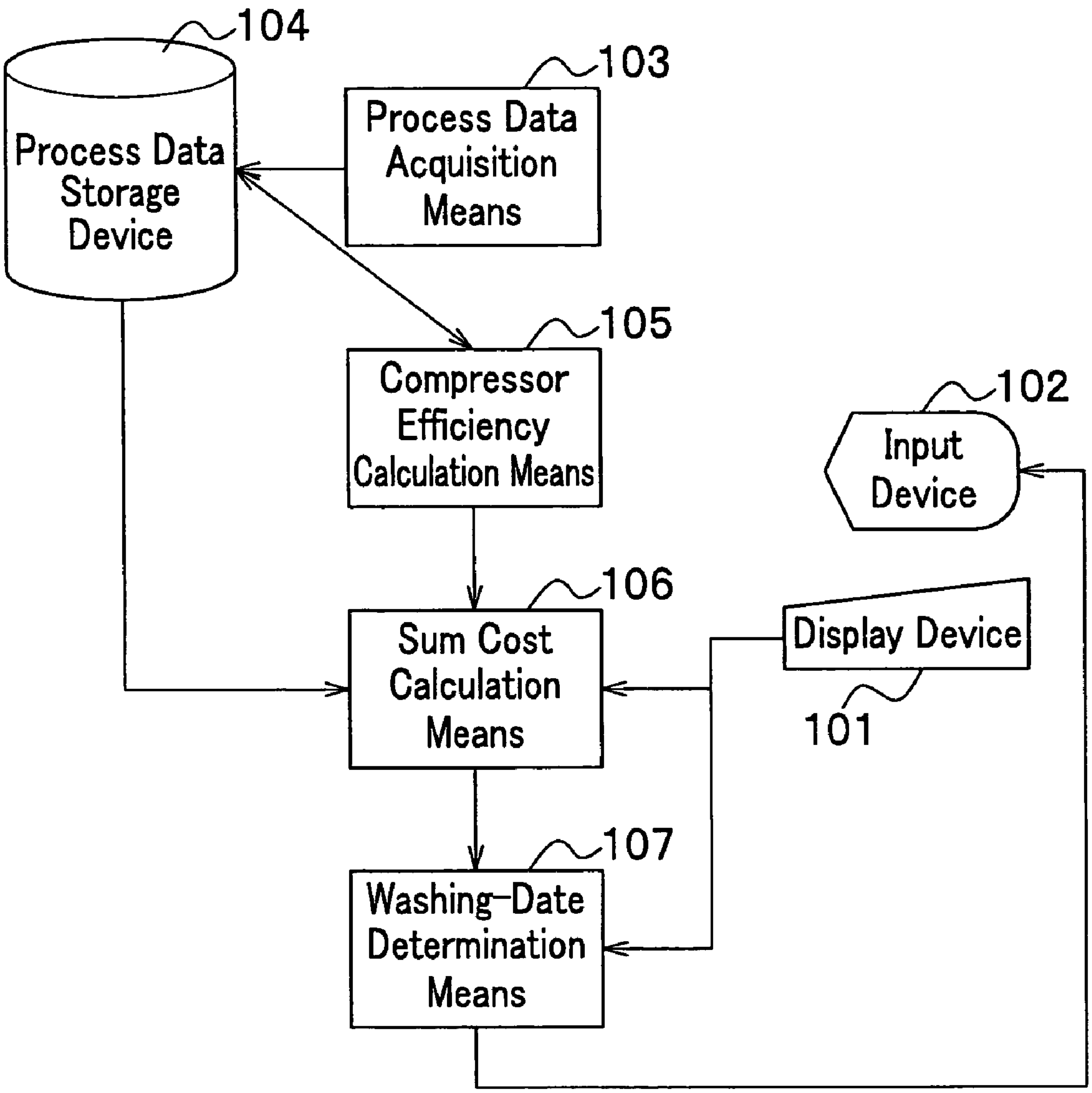
FIG. 1 is a general block diagram showing a system configuration in one embodiment of the present invention.

In FIG. 1 is shown a basic embodiment of a gas turbine water washing-date determination apparatus in accordance with the present invention.

A system of the present invention comprises an input device 101, a display device 102, a process data acquisition means 103, a process data storage device 104, a compressor efficiency calculation means 105, a sum cost calculation means 106, and a washing-date determination means 107.

The process data acquisition means 103 acquires process data such as sensor data and control signals of a gas turbine plant. The acquired process data is stored in the process data storage device 104. The compressor efficiency calculation means 105 calculates a compressor efficiency from the process data. The sum cost calculation means 106 calculates a sum value of loss cost accompanied by a lowering of the compressor efficiency. The washing-date determination means 107 determines a washing-date from the sum value of the loss cost.

Figure 2:
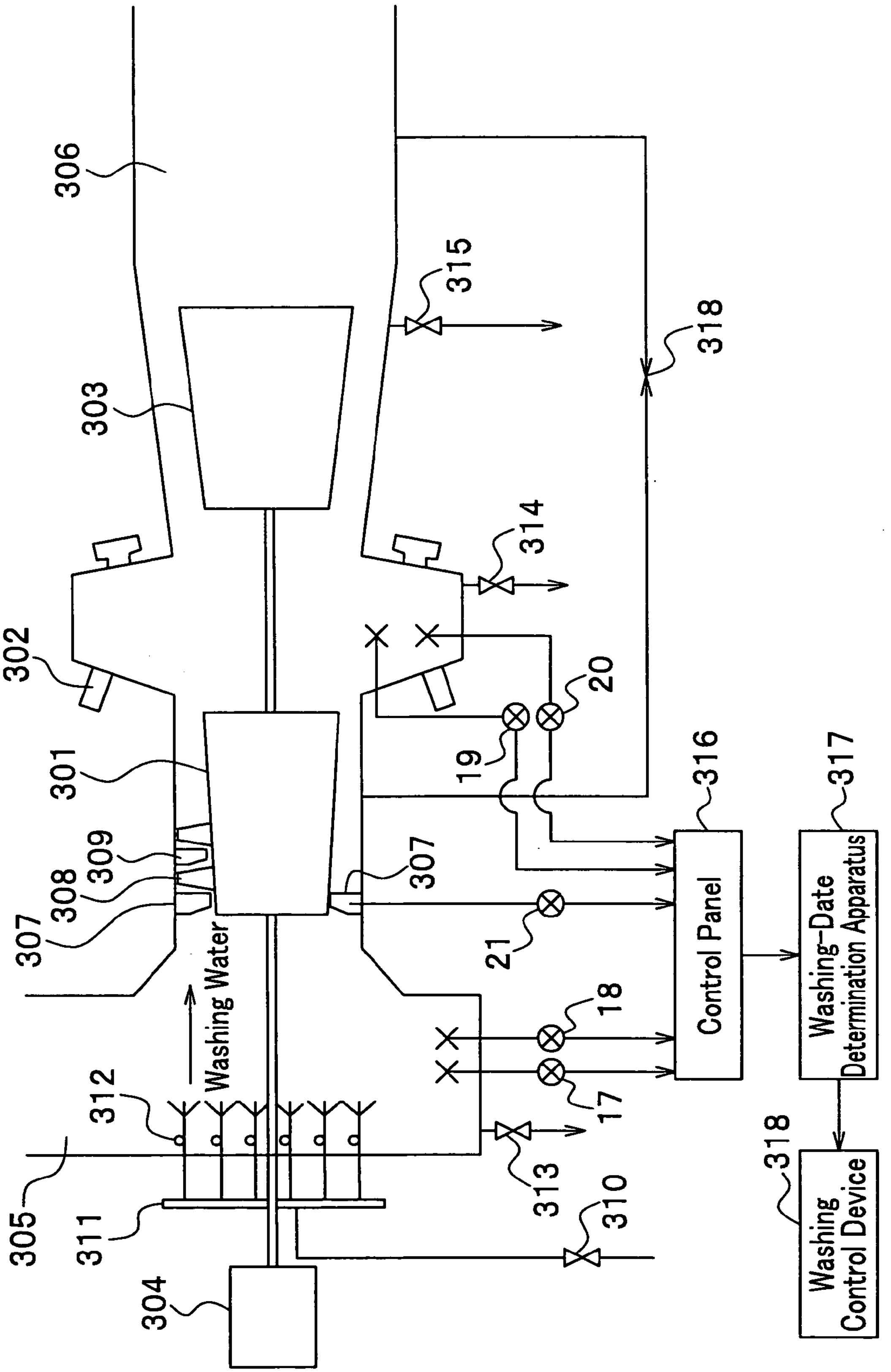
FIG. 2 is a drawing showing one example of a general configuration of gas turbine equipment including one embodiment of the present invention.

In FIG. 2 is shown a general configuration of a gas turbine plant where a gas turbine compressor washing-date determination apparatus is built in. In FIG. 2 the gas turbine plant comprises a compressor 301, a burner 302, and a turbine 303, and becomes a power source for driving a generator 304. Air, which is introduced from an air intake chamber 305, enters the burner 302 through the compressor 301. In the burner 302 air and a fuel are mixed, are ignited by an ignition device (not shown), are burned, and a combustion gas is generated. The turbine 303 is rotated by the combustion gas and mechanical energy is obtained. The combustion gas is exhausted from an exhaust chamber 306. As a rotation number of the turbine 303 increases, an air flow amount increases and an outlet pressure of the compressor 301 ascends. Increasing a fuel together with an increase of a wind amount, an output of the turbine 303 increases, becomes larger than shaft motive energy of the compressor 301 at certain timing, and enters in self-operation. Then, a difference between the output of the turbine 303 and the shaft motive energy of the compressor 301 becomes an output of a gas turbine. The compressor 301 comprises inlet guide vanes 307, a compressor rotor vane 308, and a compressor stator vane 309. If dust and the like adhere to these vane surfaces and an air flow passing therein is disturbed, a compressor efficiency lowers, the shaft motive energy increases, additionally a suction air amount lowers, and thus the output of the turbine lowers.

Therefore, the compressor 301 is washed by a compressor water-washing apparatus. The compressor water-washing apparatus comprises a washing water supply system for supplying washing water to the compressor 301, a water-washing control valve 310, a water-washing manifold 311, and water-washing nozzles 312. In addition, for a purpose of discharging a drain after water-washing outside the gas turbine, the gas turbine plant comprises a suction chamber drain valve 313, a combustion chamber drain valve 314, and a turbine drain valve 315. And based on data collected by a control pane 316, a washing-date determination apparatus 317 shown in FIG. 1 implements a washing-date determination.

At a suction portion of the compressor 301 are provided a pressure oscillator 17 and a temperature oscillator 18; at one of the inlet guide vanes 307 is provided a vane opening oscillator 21; at a compressor discharge portion are provided a pressure oscillator 19 and a temperature oscillator 20; and those data is collected to the control pane 316.

In a case of an issue of a washing instruction by the washing-date determination apparatus 317, open the water-washing valve 310; spray washing water from the washing-water supply system through the water-washing nozzles 312; wash the compressor 301; after washing, open the suction chamber drain valve 313, the combustion chamber drain valve 314, and the turbine drain valve 315; and discharge the drain outside the gas turbine. Meanwhile, provide a compressor-surging-prevention drain valve 318 between the compressor 301 and the exhaust chamber 306. In addition, desirably provide a washing control device 318 rather than the compressor-surging-prevention drain valve 318, drive an instrument necessary for washing, depending on a determination result of the washing-date determination apparatus 317, and thus automatically implement the washing.

Here will be described a detail of each device configuring a system of the present invention.

Figures 4, 5:
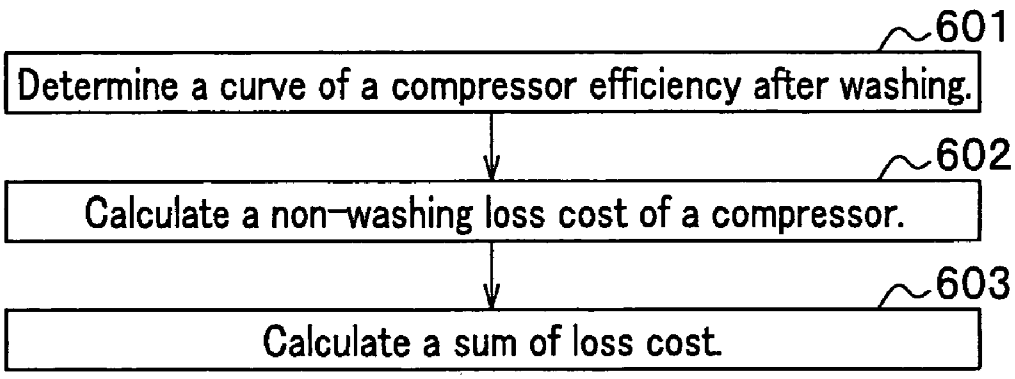
FIG. 4 is a drawing showing another example of a data storage format of a process data storage device.
FIG. 5 is a processing flowchart of a calculation means of sum cost.

In FIG. 3 is shown a storage format of process data, which is stored in the process data storage device 104. Storage data is comprised of a date column and process data columns containing a compressor inlet temperature, a compressor discharge temperature, a compressor inlet pressure, a compressor discharge pressure, and an inlet guide vane angle; the date column stores a date of data; and the process data columns store data values, respectively. The process data columns can also appropriately store other sensor data and control instruction data of the gas turbine such as a turbine inlet temperature, a turbine outlet temperature, and a turbine pressure. In addition, the process data storage device 104 can also store process name data, which is data related to a process name of each column of the process data columns. A storage format of the process name data is shown in FIG. 4. A process name column stores a process name; a process name tag No. column stores a process tag representing a tag name of data corresponding to the process name; and a unit column stores a unit in storing the data.

The process data acquisition means 103 acquires the process data from the control pane 316 of the gas turbine and stores it in the process data storage device 104. A user can arbitrary specify an acquisition interval of the process data from per second to per month.

Meanwhile, the process data acquisition means 103 and the process data storage device 104 can also be made a configuration, which is arranged at a remote place, and in this case they are connected by a network means such as a local area network, the Internet, an exclusive line, and a wireless local area network. The process data acquisition means 103 transmits the process data via a network together with acquiring the process data and stores it in the process data storage device 104.

In addition, the process data acquisition means 103 can also store data, which is manually input by a user, as the process data in the process data storage device 104.

The compressor efficiency calculation means 105 calculates a compressor efficiency with using the process data. It calculates the compressor efficiency from a compressor inlet temperature, compressor inlet pressure, compressor discharge temperature, and compressor discharge pressure of the process data at a certain date in accordance with a following expression:

$$\eta_c=((P_2/P_1)^{\kappa-1/\kappa}-1)/(T_2/T_1-1),$$

where $\eta_c$, a compressor efficiency; $P_1$, a compressor inlet pressure; $P_2$, a compressor outlet pressure; $T_1$, a compressor inlet temperature; $T_2$, a compressor outlet temperature; and $\kappa$, a specific heat ratio of air.

Furthermore, then a compensation compressor efficiency can also be calculated by the compressor inlet temperature and an inlet guide vane opening, and in this case the compressor efficiency is obtained by a following expression:

a compressor efficiency after compensation=a compressor efficiency−a temperature compensation coefficient−a guide vane opening compensation coefficient.

In the temperature compensation coefficient and the guide vane opening compensation coefficient are kept compensation coefficient values for values of a temperature and vane opening for every constant interval in a table format; a compensation coefficient for a specified temperature and vane opening is calculated by compensation coefficient values of a nearest temperature and vane opening or by an interpolation of before/after compensation coefficient values.

Figure 6:
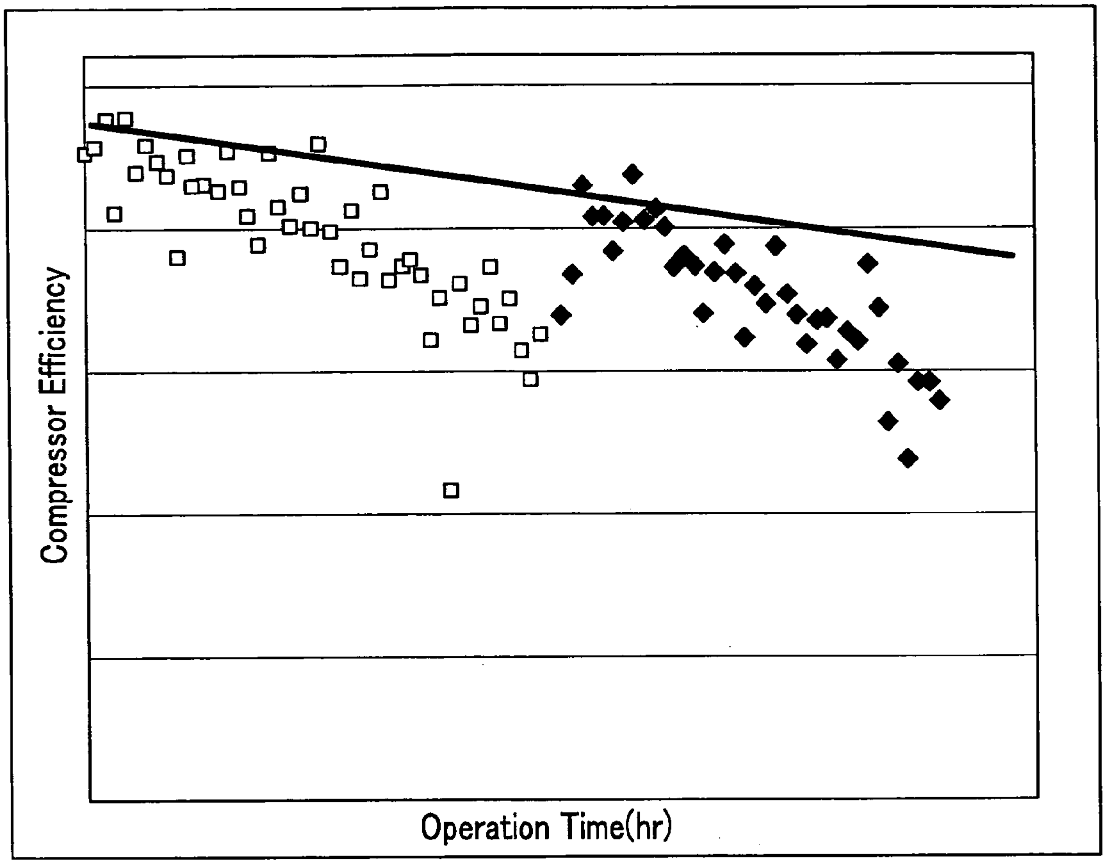
FIG. 6 is a drawing showing one example of a recovery expectation line of a compressor efficiency.

The sum cost calculation means 106 calculates a sum value of loss cost accompanied by a compressor efficiency lowering. A processing flow of the sum cost calculation means 106 will be described, using a block diagram in FIG. 5. First, determine a recovery expectation line of a compressor after washing in Step 601. This is an expectation line of a compressor efficiency after the washing, which line represents how far the compressor efficiency recovers, when the washing of a compressor is implemented in each operation time. Although the compressor efficiency recovers by the washing, in general it does not completely recover as it was before because contaminants are not completely removed and the like. Step 601 obtains an average value of several times of compressor efficiencies just after washing at each time of water-washing implemented in the past, determines a line approximating this, and thus makes it the recovery expectation line of the compressor efficiency. In addition, in a determination of a first water-washing time, Step 601 obtains the recovery expectation line, using an inclination of a previous approximation line in a same plant or that of an approximation line in a similar operation condition in another plant. In FIG. 6 is shown an output example of a recovery expectation line of the compressor efficiency.

Next, Step 602 calculates loss cost due to not washing the compressor at an operation time of each process data. This calculates additional cost as the loss cost due to not washing the compressor, which additional cost occurs by a compressor efficiency being lowered due to contaminants of the compressor; thereby a power generation efficiency of the gas turbine being lowered on the whole; and any of a power generation amount being lowered and a fuel increase being accompanied. Therefor, first obtain a fuel increase rate coefficient f at each operation time from a heat efficiency expectation value $\eta_{th1}$ in a case of washing and an actual-measurement heat efficiency expectation value $\eta_{th2}$:

$$f=\eta_{th1}/\eta_{th2}.$$

Obtain respective heat efficiencies $\eta_{th1}$ and $\eta_{th2}$ from a compressor inlet temperature T1, a compressor inlet temperature T2, a compressor inlet pressure P1, a compressor outlet pressure P2, a turbine inlet temperature T3, a turbine outlet temperature T4, a turbine inlet pressure P3, and a turbine outlet pressure P4, which are stored in the process data storage device 104, by expressions below:

$$\eta_{th1}=((\tau\eta_c\eta_c-\theta)(1-\theta^{-1}))/((\eta_c\tau-\theta)(1-\eta_c)),$$

$$\tau=T_3/T_1,$$

$$\theta=(P_2/P_1)^{\kappa-1/\kappa}, \text{ and}$$

$$\eta_{th2}=(T_4/T_3-1)/((P_2/P_1)^{\kappa-1/\kappa}-1).$$

Meanwhile, the fuel increase rate coefficient f can also be obtained by a user inputting a constant value because a relationship between the compressor efficiency and a fuel increase rate can be assumed to be approximately linear. Next, calculate a fuel increase amount, summing a fuel flow amount, which is stored in the process data storage device 104, to the fuel increase rate coefficient f. Then, calculate the loss cost, summing a fuel price coefficient to the fuel flow amount. Although the fuel price coefficient of a fuel price per weight actually varies, depending on a purchase period, it can be obtained by a user inputting a constant value for a simplification.

Next, Step 603 calculates a sum value of the loss cost due to not washing the compressor. This is implemented by summing up the loss cost calculated in Step 602 and an operation time interval till next process data, and calculating a summation from a last water-washing time of this summed-up value.

Figure 7:
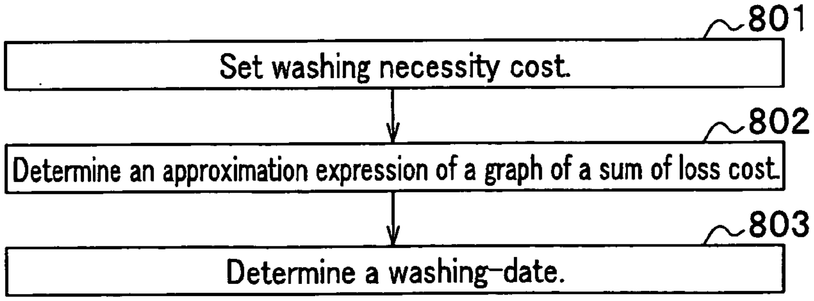
FIG. 7 is a processing flowchart of a washing-date determination means.

The washing-date determination means 107 determines a washing-date, using the sum of the loss cost. A processing flow of the washing-date determination means 107 will be described, using a block diagram of FIG. 7.

First, Step 801 sets cost necessary for water-washing in accordance with any of a user's input and a specified value in advance. This is total cost necessary for implementing the water-washing and a sum of operation cost, loss cost due to not generating power during washing, and detergent cost.

Next, Step 802 determines an approximation expression of a graph of a sum of non-washing loss cost. Because a relationship of a lowering of a compressor efficiency for time can be usually assumed to be linear, and furthermore, a relationship between the compressor efficiency and fuel corresponding data can be assumed to be linear in a range where a variation width of the compressor efficiency is less, the approximation expression can be assumed as a formula of f(x)=a*x*x. However, Step 802 determines an approximation line by a quadratic polynomial for a detailed determination when specified by a user. This formula is f(x)=a*x*x+b*x+c, and values of coefficients a, b, and c are obtained so that a square sum of a difference between each data of the sum of the loss cost and the formula becomes minimum.

Next, Step 803 determines a water-washing date from the sum of the loss cost and the water-washing necessity cost. When the approximation expression of the graph of the sum of the loss cost in Step 802 is the formula of f(x)=a*x*x, Step 803 assumes the washing-date to be a point where the sum of the non-washing loss cost reaches the water-washing necessity cost in Step 801, that is, an intersection in the graph. In addition, assuming that the water-washing necessity cost is k when the formula of the approximation expression of the graph of the sum of the loss cost is f(x)=a*x*x+b*x+c, Step 803 makes an intersection of the graph and $k+b\sqrt{(k-c)/a}$ the water-washing date. When the sum of the non-washing loss cost does not reach the sum of the non-washing loss cost, Step 803 expects a sum of cost in the future by an approximation function of the sum of the loss cost and can expect the water-washing date by an intersection of the approximation function and any of k and $k+b\sqrt{(k-c)}/a$.

Figure 8:
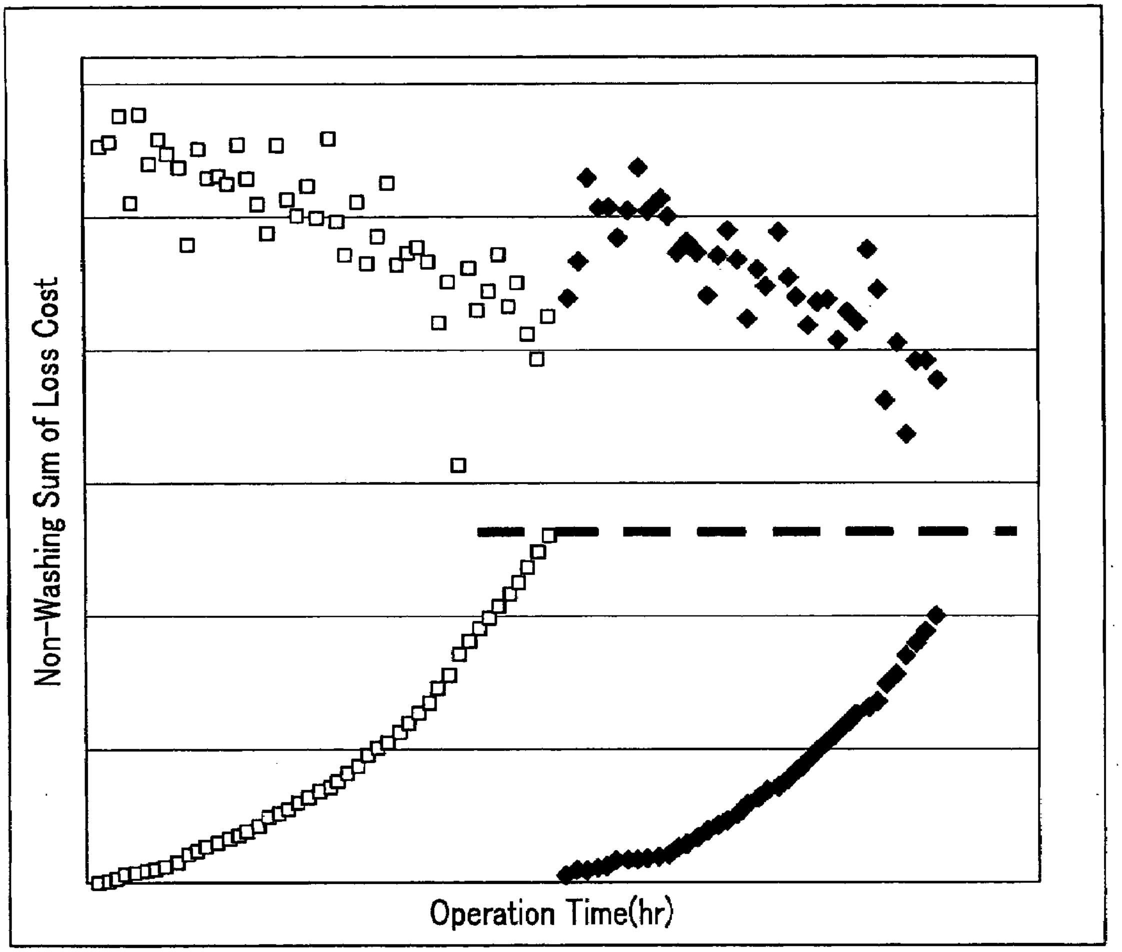
FIG. 8 is a drawing showing one example of an output screen of a washing-date determination means.

Then in a display device is output a graph of compressor efficiencies, sums of loss cost, and washing necessity cost for an operation time, depending on a need/no need of water-washing at present and an expected water-washing day, which are determined by the washing-date determination means 107, and a user's instruction; and based on this, the user implements the water washing. In FIG. 8 is shown one example of an output graph.

[Embodiment 2]

Figure 9:
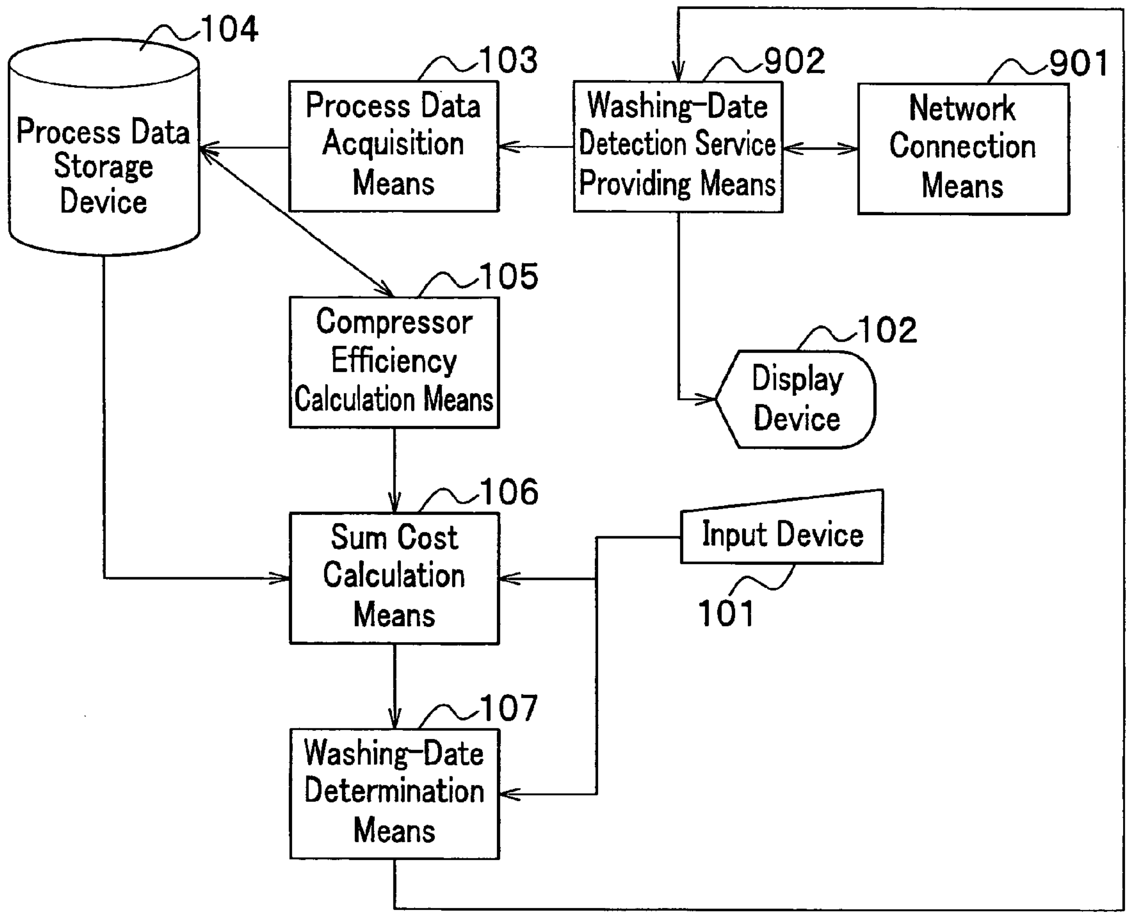
FIG. 9 is a general block diagram showing a system configuration in another embodiment of the present invention.

In a second embodiment will be described an example of a gas turbine determination apparatus, which comprises a washing detection service for noticing a washing-date determination result. In FIG. 9 is shown one example of a general configuration of a gas turbine washing detection apparatus. A network connection means 901 follows a data carrier system such as an e-mail and a WWW (World Wide Web site), connects a network such as the Internet and an exclusive line, and inputs/outputs data. Through the network connection means 901 a user inputs process data of a possessed gas turbine on a screen, transmits a file that stores the process data, or directly transmits data of a control panel and transmits an identifier that can identify the user and a gas turbine plant. A washing-date detection service providing means 902 inputs the transmitted process data in a process data acquisition device; thereby activates a compressor efficiency calculation means, a sum cost calculation means, and a washing-date determination means; and obtains a washing-date determination result. Next, the providing means 902 transmits the determination result to the user and records a return-destination-user's name, a processing date, and a processing result within itself. These data can be appropriately output in a display device; and a confirmation of a service implementation history and an accounting administration can be made. Thus can be implemented the providing service of the washing-date determination result Thus, although the embodiments of the present invention are described, the invention is not limited to such the embodiments and various variations are available without departing from the spirit and scope of the invention.

What is claimed is:

1. A gas turbine washing-date determination apparatus comprising:

a sum cost calculation means for calculating a sum of loss cost due to not washing a compressor from a compressor efficiency calculated, wherein said gas turbine washing-date determination apparatus determines a gas turbine washing-date, using said sum of said loss cost, and wherein said compressor efficiency is calculated from process data of a gas turbine plant and a compressor washing-date is determined, based on the compressor efficiency.

2. A gas turbine washing-date determination apparatus according to claim 1, wherein said compressor efficiency is calculated from a compressor inlet temperature, a compressor inlet pressure, a compressor discharge temperature, and a compressor discharge pressure at a certain date of said process data.

3. A gas turbine washing-date determination apparatus according to claim 1, the apparatus comprising:

a process data storage device for storing said process data;

a compressor efficiency calculation means for calculating said compressor efficiency from the process data stored in said process data storage device;

a sum cost calculation means for calculating a sum of loss cost due to not washing said compressor from the calculated compressor efficiency; and a washing-date determination means for determining a gas turbine washing-date, using the calculated sum of the loss cost.

4. A gas turbine washing-date determination apparatus according to claim 3, wherein said washing-date determination means compares a sum of loss cost calculated by said sum cost calculation means with gas turbine washing necessity cost, and determines a time of both being equal as a washing-date.

5. A gas turbine washing-date determination apparatus according to claim 4 that transmits a gas turbine washing-date to a user, wherein washing-date is output by said washing-date determination means based on process data, wherein said process data is input in said process data storage device via a network, and wherein said gas turbine washing-date determination apparatus further comprises a washing-date detection service providing means for outputting a user's name, a processing date, and a processing result.

6. A gas turbine washing-date determination apparatus according to claim 3 that further comprises a washing control device for driving a control panel of a gas turbine and a compressor washing device at a relevant washing-date, based on a washing-date determined by said washing-date determination means, and implementing compressor washing.

7. A gas turbine washing-date determination apparatus according to claim 1, wherein said sum cost calculation means calculates a compressor efficiency recovery expectation value, calculates a compressor efficiency lowering value from a difference from said compressor efficiency calculated from said process data, converts the calculated compressor efficiency lowering value to a fuel increase amount, converts the converted fuel increase amount to cost, and determines sum cost by a time integration of the converted cost.

8. A gas turbine washing-date determination apparatus according to claim 7, wherein an average value of a compressor efficiency is obtained just after washing of each time, which is implemented in the past, and said compressor efficiency recovery expectation value is obtained by determining a line for approximating the average value.

9. A gas turbine washing-date determination method comprising the steps of:

calculating a compressor efficiency from process data of a gas turbine plant;

determining a compressor washing-date, based on said compressor efficiency;

calculating a sum of loss cost due to not washing said compressor from the calculated compressor efficiency; and determining a gas turbine washing-date with using the sum of the loss cost.

10. A gas turbine washing-date determination method according to claim 9 comprising the steps of:

reading process data of a gas turbine plant stored in a process data storage device;

calculating a compressor efficiency from said process data;

calculating a sum of loss cost due to not washing a compressor from the calculated compressor efficiency; and determining a gas turbine washing-date with using the calculated sum of the loss cost.

11. A gas turbine washing-date determination method according to claim 10, wherein a step of calculating said sum of said loss cost calculates a compressor efficiency recovery expectation value in a case that said compressor is washed, calculates a compressor efficiency lowering value out of a difference from said compressor efficiency calculated by said compressor efficiency calculation step, converts the compressor efficiency calculated lowering value to a fuel increase amount, converts the converted fuel increase amount to cost, and determines sum cost by a time integration of the converted cost.

12. A gas turbine washing-date determination method according to claim 11, wherein a step of determining said washing-date compares a sum of loss cost calculated by another step of calculating said sum of said loss cost with gas turbine washing necessity cost, and determines a time of both being equal as a washing-date.

13. A gas turbine washing-date determination method according to claim 12 which transmits a gas turbine washing-date, based on process data input in said process data storage device via a network; wherein the gas turbine washing-date is output by said washing-date determination step, to a user; wherein said gas turbine washing-date determination method further comprises a washing-date detection service providing step of outputting a user name, a processing date, and a processing result.

14. A gas turbine washing-date determination method according to claim 9, wherein said compressor efficiency is calculated from a compressor inlet temperature, a compressor inlet pressure, a compressor discharge temperature, and a compressor discharge pressure at a certain date of said process data.

15. A computer-readable recording medium for storing a gas turbine washing-date determination program that makes a computer run a step of reading process data of a gas turbine plant stored in a process data storage device, a processing of calculating a compressor efficiency from said process data, another processing of calculating a sum of loss cost due to not washing a compressor, and still another processing of determining a gas turbine washing-date with using the calculated sum of the loss cost.

* * * * *